United States Patent
Lee et al.

(10) Patent No.: US 10,452,060 B2
(45) Date of Patent: Oct. 22, 2019

(54) SYSTEM AND METHOD FOR MONITORING MULTI-PROJECTION THEATER

(71) Applicant: CJ CGV CO., LTD., Seoul (KR)

(72) Inventors: Du Hui Lee, Suwon-si (KR); Kyung Yoon Jang, Seoul (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

(21) Appl. No.: 15/852,382

(22) Filed: Dec. 22, 2017

(65) Prior Publication Data

US 2019/0187671 A1 Jun. 20, 2019

(30) Foreign Application Priority Data

Dec. 20, 2017 (KR) ........................ 10-2017-0176092

(51) Int. Cl.
| | |
|---|---|
| *H04N 9/31* | (2006.01) |
| *G05B 23/02* | (2006.01) |
| *G03B 21/14* | (2006.01) |
| *G06F 11/07* | (2006.01) |

(52) U.S. Cl.
CPC ............. *G05B 23/02* (2013.01); *G03B 21/14* (2013.01); *G06F 11/07* (2013.01); *H04N 9/3147* (2013.01)

(58) Field of Classification Search
CPC ...... H04N 9/3147; G05B 23/02; G03B 21/14; G06F 11/07
USPC ......................................................... 348/180
See application file for complete search history.

(56) References Cited

U.S. PATENT DOCUMENTS

| | | | |
|---|---|---|---|
| 2007/0005305 A1* | 1/2007 | Sprogis .............. | G05B 23/0264 702/188 |
| 2007/0058140 A1 | 3/2007 | Kobayashi et al. | |
| 2008/0024389 A1* | 1/2008 | O'Brien-Strain .... | H04N 9/3194 345/1.2 |
| 2008/0129894 A1* | 6/2008 | Kang ................... | H04N 9/3147 348/758 |
| 2011/0234896 A1* | 9/2011 | Ivashin ................ | H04N 9/3147 348/445 |
| 2013/0181901 A1 | 7/2013 | West | |

(Continued)

FOREIGN PATENT DOCUMENTS

| | | |
|---|---|---|
| KR | 10-1031062 B1 | 4/2011 |
| KR | 10-2014-0022141 A | 2/2014 |
| KR | 10-2014-0063536 A | 5/2014 |

(Continued)

OTHER PUBLICATIONS

International Search Report for PCT/KR2017/015169 dated Sep. 18, 2018.

(Continued)

*Primary Examiner* — Michael Lee
(74) *Attorney, Agent, or Firm* — Hauptman Ham, LLP (57) ABSTRACT

A system for monitoring a multi-projection theater includes a plurality of projection surfaces disposed within a single theater, a projection apparatus configured to project content onto the plurality of projection surfaces, a central control server configured to monitor inside of the theater, and an administrator terminal configured to receive the monitoring information of the central control server. The central control server transmits error information to the administrator terminal when an image information error of content projected onto the plurality of projection surfaces is generated.

16 Claims, 7 Drawing Sheets

(56) References Cited

U.S. PATENT DOCUMENTS

2016/0353068 A1* 12/2016 Ishikawa .............. H04N 9/3147
2017/0102908 A1* 4/2017 Aruga .................... G09G 5/003

FOREIGN PATENT DOCUMENTS

| KR | 10-1489261 B1 | 2/2015 |
| WO | 2015/030399 A1 | 3/2015 |
| WO | 2016/099085 A1 | 6/2016 |

OTHER PUBLICATIONS

Korean Office Action dated Apr. 12, 2019, in connection with the Korean Patent Application No. 10-2017-0176092.

* cited by examiner

SYSTEM AND METHOD FOR MONITORING MULTI-PROJECTION THEATER

CROSS-REFERENCE TO RELATED APPLICATION

This application claims priority to and the benefit of Korean Patent Application No. 10-2017-0176092, filed in the Korean Intellectual Property Office on Dec. 20, 2017 respectively, the entire contents of which are incorporated herein by reference.

This work was supported by Institute for Information & communications Technology Promotion (IITP) grant funded by the Korea government (MSIT) (No. 20160003490022003, Development of a Multi-screen Movie Theatre System and Immersive Content).

TECHNICAL FIELD

The present invention relates to a system and method for monitoring a multi-projection theater, wherein the playback of content is managed in a multi-projection theater including a plurality of projection surfaces.

BACKGROUND ART

With the recent development of the movie screening technology, a three-dimensional (3D) image technology capable of providing audiences with an image having a 3D effect is emerging. The 3D image technology is based on the principle that if different images are input to the left eye and right eye of a person and combined in the brain, the person can feel a 3D effect in a plane image. Two cameras on which different polarization filters have been mounted are used to capture images. Upon watching the images, a person wears glasses having polarization filters mounted thereon so that different images can enter the left eye and right eye of the person.

However, such a 3D technology is merely a technology which can provide a user with a 3D-effect image, but enables a user to merely watch an image played back on a single screen and thus has a poor feeling of immersion into an image itself. Furthermore, this 3D technology has a limit in that the direction of a 3D effect felt by audiences is limited to the direction in which a single screen is present.

Furthermore, the 3D technology may make inconvenient audiences who watch an image because they have to wear glasses having polarization filters mounted thereon when watching the image. Furthermore, sensitive audiences may experience dizziness or nausea because different images are forced to be artificially input to the left eye and the right eye.

Accordingly, there was proposed a multi-projection screening system capable of solving the problems of a screening system based on a single screen. The multi-projection screening system means a technology in which a plurality of projection surfaces is disposed near the seats and a single connected image is projected onto the plurality of projection surfaces to provide audiences with a 3D effect and a feeling of immersion.

A multi-projection screening system is being developed, but has a disadvantage in that whether a single piece of connectivity content is properly projected onto a plurality of screens cannot be checked because most of on-going movie content is played back in a single screen.

Furthermore, there are problems in that the number of projection experts who can manage a multi-projection theater is insufficient compared to the number of multi-projection theaters and it is inefficient to deploy projection experts in all of the multi-projection theaters in terms of manpower management.

Accordingly, there is a need for the development of a system capable of automatically monitoring a theater system and performing corresponding management in order to improve manpower management efficiency in a theater and projection quality of a multi-projection theater.

DISCLOSURE

Technical Problem

An embodiment of the present invention is to control a point of time at which content is correctly projected by a projection apparatus using a plurality of screens within a theater.

An embodiment of the present invention is to provide a user with multi-screening service not having inconvenience when the user watches content.

An embodiment of the present invention is to allow an administrator to take proper measures according to a situation by providing information about a content projection error situation.

Technical objects of the present invention are not limited to the aforementioned objects, and those skilled in the art to which the present invention pertains may evidently understand other technological objects from the following description.

Technical Solution

In an embodiment of the present invention, a method of monitoring a multi-projection theater includes the steps of monitoring a plurality of projection surfaces disposed within a theater and transmitting information of the theater according to the monitoring to an administrator terminal.

In an embodiment of the present invention, the method further includes the steps of photographing a projection surface including at least one projection region prior to the step of monitoring the projection surfaces and receiving image information of the projection surface, identifying the at least one projection region based on the received image information, and setting a reference pixel value of the projection surface based on the received image information.

In an embodiment of the present invention, the step of monitoring the projection surfaces includes steps of receiving the image information of the projection surface including the at least one projection region, the image information being photographed by a photographing apparatus at predetermined time intervals and comparing average pixel values in the at least one projection region within the image information with the reference pixel value of the projection surface.

In an embodiment of the present invention, the method further includes the step of detecting an error of a projection-related apparatus within the theater if the average pixel value within the at least one projection region is different from the reference pixel value, wherein error information of the theater and a handling method according to the error information are transmitted to the administrator terminal.

In an embodiment of the present invention, the step of detecting the error includes steps of checking a network state of the projection-related apparatus, checking state information of a projection apparatus corresponding to the at least one projection region, and checking an error of a central control server managing content projected by the projection apparatus.

In an embodiment of the present invention, the error information 는, the error information includes at least one of network error information of the projection-related apparatus, error information of the projection apparatus itself, and error information of software associated with the projection apparatus.

In an embodiment of the present invention, the step of identifying the at least one projection region includes identifying the projection region using at least one of an RGB value of a content image projected onto the projection surface by a projection apparatus corresponding to the at least one projection region, a specific pattern within the image, and a shape of the image.

In an embodiment of the present invention, the method further includes the step of controlling an operation of a projection-related apparatus provided within the theater based on a result of the monitoring.

In an embodiment of the present invention, the step of receiving the image information of the projection surface includes steps of comparing a point of time at which the projection surface is photographed with previously stored content playback information, and if the point of time at which the projection surface is photographed is not a point of time at which content is projected onto an auxiliary projection surface of the plurality of projection surfaces, comparing an average pixel value of at least one projection region included in the auxiliary projection surface with the reference pixel value of the projection surface.

A method of monitoring a multi-projection theater according to another embodiment of the present invention includes the steps of monitoring information of content projected onto a plurality of projection surfaces disposed within a theater, and transmitting information of the theater according to the monitoring to an administrator terminal.

In an embodiment of the present invention, the step of monitoring the content information includes steps of receiving the information of the content projected onto the plurality of projection surfaces in real time from one or more projection apparatuses, obtaining image information of the content projected by the one or more projection apparatuses by capturing the real-time received content, and comparing an average pixel value of the obtained image information with previously stored reference pixel value.

In an embodiment of the present invention, the reference pixel value is determined based on a gray scale value of the content projected by the one or more projection apparatuses.

In an embodiment of the present invention, the method further includes the steps of detecting an error of a projection-related apparatus within the theater if the average pixel value of the obtained image information is different from the previously stored reference pixel value, and transmitting error information of the theater and a handling method according to the error information to the administrator terminal.

In an embodiment of the present invention, the step of detecting the error includes the steps of checking a network state of a projection apparatus, checking state information of the projection apparatus, and checking an error of a central control server managing content projected by the projection apparatus.

In an embodiment of the present invention, the error information includes at least one of network error information of the projection apparatus, error information of the projection apparatus itself, and error information of software associated with the projection apparatus.

In an embodiment of the present invention, the step of receiving the information of the content in real time includes communicating with the one or more projection apparatuses using a loop through port.

In an embodiment of the present invention, the step of obtaining the image information of the content includes steps of comparing a point of time at which the image information is obtained with previously stored content playback information, and if the point of time at which the image information is obtained is not identical with a point of time at which the content is projected onto an auxiliary projection surface of the plurality of projection surfaces, comparing the average pixel value of the image information being projected with the previously stored reference pixel value.

In an embodiment of the present invention, the method further includes the step of controlling an operation of a projection apparatus corresponding to the plurality of projection surfaces based on a result of the monitoring.

A system for monitoring a multi-projection theater according to an embodiment of the present invention includes a plurality of projection surfaces disposed within a single theater, a projection apparatus configured to project content onto the plurality of projection surfaces, a central control server configured to monitor inside of the theater, and an administrator terminal configured to receive the monitoring information of the central control server, wherein the central control server transmits error information to the administrator terminal when an image information error of content projected onto the plurality of projection surfaces is generated.

In an embodiment of the present invention, one or more projection apparatuses corresponding to the plurality of projection surfaces are provided, and the system further includes a photographing apparatus configured to photograph a projection surface including a projection region onto which the one or more projection apparatuses project content at predetermined time intervals.

In an embodiment of the present invention, one or more projection apparatuses corresponding to the plurality of projection surfaces are provided, and the central control server receives content information projected by the projection apparatus through communication with the one or more projection apparatuses using a loop through method and monitors the received content information.

In an embodiment of the present invention, the error information 는, the error information includes at least one of network error information of the projection apparatus, error information of the projection apparatus itself, and error information of software associated with the projection apparatus.

Advantageous Effects

In accordance the present invention, there is an effect in that whether content is correctly projected onto a plurality of screens can be checked using environment information within a theater.

In accordance the present invention, a multi-projection theater can be effectively managed even without an expert who can manage the multi-projection theater.

In accordance with the present invention, there is an effect in that a screening service not providing inconvenience to audiences can be provided by rapidly sensing and controlling a sudden error although the error is generated in a plurality of screens.

Effects of the present invention are not limited to the aforementioned effects, and various other effects may be evidently understood by those skilled in the art to which the present invention pertains from the following description.

DESCRIPTION OF REFERENCE NUMERALS

10: system for monitoring a multi-projection theater
110, 120, 130: projection surface
200: projection apparatus
300: central control server
400: administrator terminal

MODE FOR INVENTION

Hereinafter, in order to clarify the technical spirit of the present invention, embodiments of the present invention are described in detail with reference to the accompanying drawings. In describing the embodiments of the present invention, a detailed description of a related known function or element will be omitted if it is deemed to make the gist of the present invention unnecessarily vague. Elements having substantially the same functional configuration in the drawings are assigned the same reference numeral although they are shown in different drawings. For convenience of description, both an apparatus and method are described, if necessary.

Figure 1:
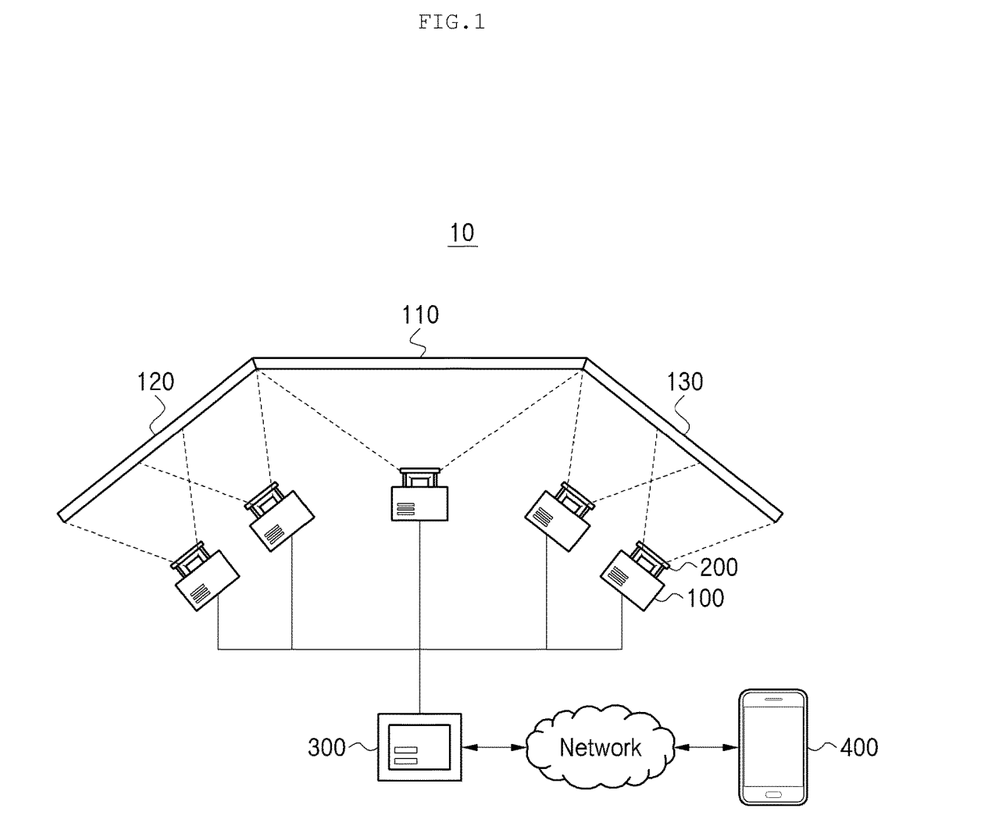
FIG. 1 is a diagram schematically showing the configuration of a system for monitoring a multi-projection theater according to an embodiment of the present invention.

FIG. 1 is a diagram schematically showing the configuration of a system for monitoring a multi-projection theater according to an embodiment of the present invention. Referring to FIG. 1, the system 10 for monitoring a multi-projection theater according to an embodiment of the present invention includes a plurality of projection surfaces 110, 120 and 130, a projection apparatus 200, a central control server 300 and an administrator terminal 400.

A theater to which the system 10 for monitoring a multi-projection theater is applied may be a multi-projection theater having a plurality of projection surfaces. In this case, the plurality of projection surfaces may include a main projection surface 110 located at the front based on the seats within the theater and auxiliary projection surfaces 120 and 130 on the left and right sides of the main projection surface 110. Furthermore, the plurality of projection surfaces may further include a ceiling within the theater and an auxiliary projection surface using a floor surface, thereby increasing a feeling of immersion into content for audiences.

The theater monitoring system 10 according to an embodiment of the present invention may further include a server outside the theater. In this case, the external server may be a server that integrates and manages a plurality of theaters located in a wide area.

The projection apparatus 200 may project content onto the projection surfaces within the theater. A plurality of the projection apparatuses 200 may be disposed in the theater because the plurality of projection surfaces is present.

In some embodiments, a plurality of the projection apparatuses 200 may be disposed to correspond to a single projection surface within the theater. A single projection apparatus 200 may be disposed to correspond to a single projection surface.

Furthermore, in an embodiment of the present invention, the projection apparatus 200 may be disposed in the direction that faces the projection surface onto which an image is projected. Furthermore, in some embodiments, the projection apparatus 200 may be disposed in the ceiling of the theater. A mirror may be mounted on the front of the projection apparatus 200 so that an image is projected onto the projection surface by adjusting the angle of the mirror. A method of disposing the projection apparatus 200 is not limited to contents described in this specification, and may include all of various deployment structures in which an image projected by the projection apparatus 200 can be played back through the projection surface.

The central control server 300 may monitor the inside of the multi-projection theater and the state of screening-related devices within the multi-projection theater. In some embodiments, the screening-related devices provided in the multi-projection theater may include the one or more projection apparatuses 200, a server associated with content projection of the projection apparatuses 200, playback software executed for screening, etc. In some embodiments, the playback software may be installed in the server and executed. Furthermore, the server associated with the content projection of the projection apparatus 200 may include a plurality of servers. In some embodiments, the server may be a single server.

Furthermore, in order to monitor the inside of the multi-projection theater, the system 10 for monitoring a multi-projection theater may further include a photographing apparatus (not shown) for photographing the inside of the theater.

The photographing apparatus means an optical device capable of photographing a photo. In an embodiment of the present invention, the photographing apparatus may be used to confirm whether content is correctly projected onto the plurality of projection surfaces 110~130.

Accordingly, resolution of the photographing apparatus may be determined based on resolution of the projection apparatus 200, the area of a theater and the number of projection apparatuses 200. Furthermore, the photographing apparatus may be disposed in an area within the theater so that it can photograph the plurality of projection surfaces 110~150, and may include various filters capable of obtaining an image even in a dark space, such as a theater. Furthermore, in some embodiments, the projection surfaces 110~150 may be photographed using a plurality of photographing apparatus having low resolution.

In accordance with an embodiment of the present invention, the photographing apparatus may include a variety of types of lenses so as to photograph projection surfaces having different widths and heights.

In an embodiment of the present invention, the central control server 300 may receive information about the state of each of apparatuses from each of pieces of equipment provided within a single theater at specific cycles or in real time.

Furthermore, the central control server 300 is connected to the projection apparatus 200 according to a loop through method, and may receive content information projected by the projection apparatus 200 in real time.

Image information may be obtained through an image capturing unit (not shown) provided in the central control server 300 based on the real-time received content information. The image capturing unit may function to capture image information of a movie or advertising content.

The theater monitoring system 10 according to an embodiment of the present invention is applied to a multi-projection theater. The image capturing unit may capture image information of content projected onto the projection surface by the one or more projection apparatuses 200 through one time capturing, and may store the captured image information in the database along with the ID numbers of the projection apparatuses 200.

For example, the image capturing unit may capture image information of content using a capturing board mounted on the central control server 300.

Furthermore, in some embodiments, the central control server 300 may play back content, received from the outside according to a predetermined organization schedule, in a specific theater on a specific time for a specific time. The predetermined organization schedule and the content may be stored in the database. As described above the database may be a recording medium capable of storing all of pieces of information managed by the central control server 300.

In an embodiment of the present invention, the central control server 300 receives a key delivery message (KDM) from an external server (not shown), such as a content distribution server. The KDM is content security data for managing the storage and screening of content. The central control server 300 may play back content stored in the central control server 300 only if a corresponding KDM is legally received.

Furthermore, in accordance with an embodiment of the present invention, the external server connected to the central control server 300 over a network may manage and supervise a plurality of theaters. In this case, the plurality of theaters may be multi-projection theaters. When an error is generated in a multi-projection theater, the external server may receive error information from the central control server 300 corresponding to the corresponding multi-projection theater.

In some embodiments, an error which may occur in a multi-projection theater and a corresponding action manual are stored in the database of the external server. When error information is received from the central control server 300, the external server may transmit a corresponding handling method and the error information to the administrator of a corresponding theater. In order to perform such a function, the external server may store personal information of administrators for each multi-projection theater.

Furthermore, such an error log and handling log may also be stored in the database of the external server in order to prevent a problematic situation occurring within a theater due to the same problem.

Furthermore, when an error is generated in apparatuses communicating with the central control server 300 or an error is generated in a projection process, the central control server 300 according to an embodiment of the present invention may transmit error information to the administrator terminal 400 of the theater monitoring system 10.

In some embodiments, when an error is generated within a multi-projection theater, the central control server 300 may control and manage an apparatus in which the error is generated. Furthermore, the central control server 300 may receive a control command from the administrator terminal 400 of an administrator who manages the theater monitoring system 10, and may control the operation of elements within the central control server 300 in response to the control command.

The administrator terminal 400 is a terminal owned by an administrator who is responsible to a multi-projection theater. ID information of the administrator terminal 400 is stored in the database of the central control server 300. Accordingly, the person in charge of the multi-projection theater can immediately notify the administrator of an error through the administrator terminal 400 when the error is generated in the multi-projection theater.

In some embodiments, the administrator terminal 400 may be an electronic device capable of a wireless network, such as a PC, a smartphone or a tablet PC. The administrator terminal 400 can receive and check information from the central control server 300.

A method of monitoring a multi-projection theater according to a first embodiment is described below.

Figure 2:
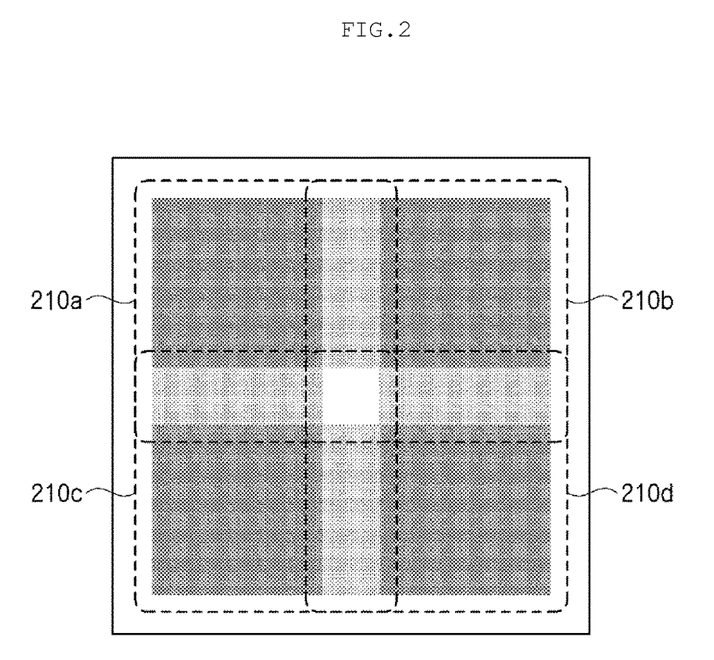
FIG. 2 is a diagram schematically showing the configuration of state in which a plurality of projection areas are displayed onto one auxiliary projection surfaces according to an embodiment of the present invention.
Figure 3:
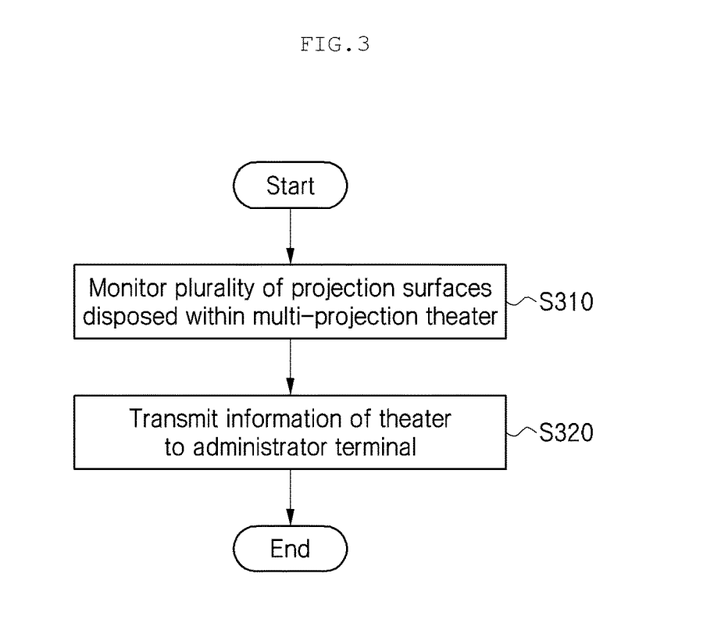
FIG. 3 is a flowchart showing part of a method of monitoring a multi-projection theater according to a first embodiment of the present invention.
Figure 4:
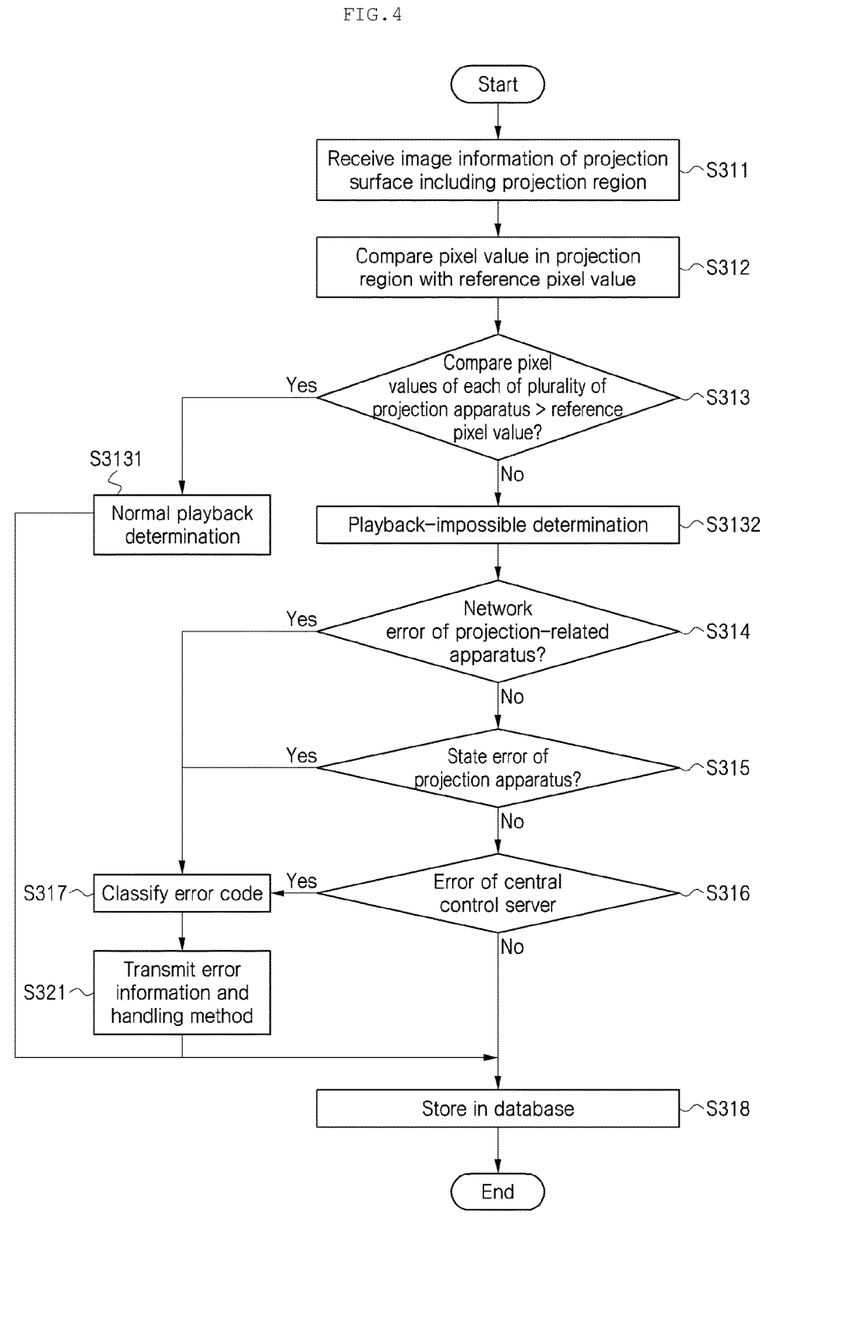
FIG. 4 is a flowchart showing part of a method of monitoring a multi-projection theater according to the first embodiment of the present invention.

FIG. 2 is a diagram schematically showing the configuration of state in which a plurality of projection areas are displayed onto one auxiliary projection surfaces according to an embodiment of the present invention. FIG. 3 is a flowchart showing part of a method of monitoring a multi-projection theater according to a first embodiment of the present invention. FIG. 4 is a flowchart showing part of a method of monitoring a multi-projection theater according to the first embodiment of the present invention. Referring to FIGS. 2 to 4, the central control server 300 monitors the plurality of projection surfaces 110~130 disposed within a multi-projection theater, and transmits information of the theater according to the monitoring to the administrator terminal 400 (S310, S320).

In the case of the auxiliary projection surfaces 120 and 130 that belong to the plurality of projection surfaces 110~130 disposed within the theater and that are disposed on the left and right sides of the main projection surface 110, the one or more projection apparatuses 200 may be used to project content because the auxiliary projection surfaces 120 and 130 have a wide area.

Accordingly, a process of identifying the one or more projection apparatuses 200 corresponding to the auxiliary projection surfaces 120 and 130 is necessary in order for the central control server 300 to perform the monitoring the plurality of projection surfaces 110~130.

To this end, the photographing apparatus captures images of a projection surface in which a plurality of projection regions 210 has been projected onto the auxiliary projection surface 120, 130. The central control server 300 receives the captured image information of the projection surface.

For example, the images of the projection surface captured by the photographing apparatus may be illustrated as in FIG. 2. The central control server 300 may perform a configuration so that different content is projected onto the projection apparatuses 200 corresponding to the plurality of projection regions 210a, 210b, 210c and 210d, and may identify the plurality of projection regions 210a, 210b, 210c and 210d.

In some embodiments, content projected by the projection apparatuses 200 may have a pattern in which black and white lines alternately appear or images having different RGB values. The database of the central control server 300 may store ID information of the plurality of projection regions 210a, 210b, 210c and 210d.

Furthermore, the process of receiving images of the projection surface from the photographing apparatus may be used to set a reference value in a process of monitoring a multi-projection theater. In some embodiments, the central control server 300 may perform a configuration so that the one or more projection apparatuses 200 corresponding to a single auxiliary projection surface 120, 130 project dark image.

For example, if the number of projection apparatuses 200 corresponding to a single projection surface is four, the plurality of projection regions 210a, 210b, 210c and 210d may be overlapped and displayed on the single projection surface as in FIG. 2.

Accordingly, the photographing apparatus may capture images of the projection surface onto which the plurality of projection apparatuses 200 has projected dark image, and may transmit the image information to the central control server 300. The central control server 300 may calculate an average value of all of pixels in each region based on the plurality of identified projection regions 210a, 210b, 210c and 210d.

In this case, a pixel value may be the RGB value of each pixel. If the pixel value is defined by 8 bits, it may have a gray scale value of 0~255. For example, if black/white are used as basis, a pixel value having dark may be close to 0, and a pixel value having white may be close to 255.

In some embodiments, if the means of the RGB values of all of the pixels are A, B, C and D of the plurality of projection regions 210a, 210b, 210c and 210d, the central control server 300 may set the reference RGB reference value of a projection surface as (A+B+C+D)/4.

After the reference value is set, the central control server 300 may perform monitoring on a multi-projection theater while content is played back in the multi-projection theater.

When content screening starts, the central control server 300 receives images of a projection surface from the photographing apparatus at predetermined time intervals (S311). In this case, the projection surface includes one or more projection regions. A reference pixel value may have been predetermined based on the number and images of projection regions.

In an embodiment of the present invention, a projection surface photographed by the photographing apparatus may be the auxiliary projection surfaces 120 and 130 corresponding to the plurality of projection apparatuses 200.

Furthermore, in an embodiment of the present invention, the photographing apparatus provided within a multi-projection theater may check the present projection condition by continuously photographing a projection surface while content is played back. In order to perform such a task, overload may occur because many central control servers 300 require heavy computational load. Furthermore, continuous photographing is impossible because it is prohibited to photograph content in the frame per second (FPS) of a specific reference or more due to the copyright problem.

Accordingly, the photographing apparatus may photograph content projected onto the plurality of projection surfaces 110~130 at time intervals set by the administrator of the theater monitoring system 10.

For example, the predetermined time interval may be 15 seconds or 30 seconds. The central control server 300 may check the present projection condition of content based on images captured at such time intervals.

Furthermore, in some embodiments, a point of time at which the photographing apparatus photographs the plurality of projection surfaces 110~130 may be set in response to a control command from the central control server 300. More specifically, if the central control server 300 and the plurality of projection apparatuses 200 are connected according to the loop through method as described above, the central control server 300 may check the operation and projected content information of the plurality of projection apparatuses 200, and may generate a control command based on the operation and projected content information.

In an embodiment of the present invention, before the photographing apparatus photographs the plurality of projection surfaces 110~130 and a determination of the photographing is made, the central control server 300 may check whether currently projected content corresponds to a point of time at which the plurality of projection surfaces 110~130 is used based on content playback information.

The central control server 300 calculates all of the pixel values of the one or more projection regions and compares the calculated pixel values with a reference pixel value (S312). Accordingly, if the calculated pixel value of the projection region, that is, the pixel value of a content image projected by the corresponding projection apparatus 200, is greater than the reference pixel value (S313), the central control server 300 may make a normal playback determination meaning that images are normally projected onto the auxiliary projection surface 120, 130 onto which a corresponding projection apparatus 200 projects the images (S3131).

In contrast, if the pixel value of the content image projected by the projection apparatus 200 is not greater than the reference pixel value, the central control server 300 may make a playback-impossible determination meaning that images are not normally projected onto the auxiliary projection surface 120, 130 onto which the corresponding projection apparatus 200 projects the images (S3132). In this case, content is not projected onto the auxiliary projection surfaces 120 and 130 or content is clearly displayed, but may appear faintly.

After the playback-impossible determination is made, the central control server 300 may perform several processes in order to detect an error within the multi-projection theater. In some embodiments, the central control server 300 may detect an error within the multi-projection theater using a projection apparatus state mode.

The central control server 300 checks the network state of the projection-related apparatus (S314). To this end, the central control server 300 may transmit a network recognition confirmation message to the projection apparatus 200 and a slave server associated with the projection apparatus 200. If a corresponding acknowledgement (ACK) message is not received from the projection apparatus 200 and the slave server for a predetermined time after the network recognition confirmation message is transmitted, the central control server 300 may determine a network error of a projection-related apparatus.

More specifically, if an ACK signal is not received from the projection apparatus 200, the central control server 300 may determine it to be a network terminal error of the projection apparatus 200 or a power cable error of the projection apparatus 200.

When the central control server 300 receives ACK signals from the projection-related apparatuses, it checks state information of the projection apparatuses 200 corresponding to the projection regions (S315). To this end, the central control server 300 may transmit the state check messages of apparatuses included in the projection apparatus 200. For example, the state check messages may include a message indicative of the remaining lifespan of a lamp included in the projection apparatus 200, a message indicative of the operating time of the lamp, the error check message of a fan included in the projection apparatus 200, an inlet port temperature check message, and the error check message of a light-emitting module (e.g., a laser) included in the projection apparatus 200. The projection apparatus 200 provides information corresponding to the state check message of the central control server 300. The central control server 300 may check the error information based on the provided information.

The central control server 300 checks an error in the central control server itself (S316). This may be a process of checking the playback software installed in the central control server 300. The installed playback software may have a storage error of the database or an error of a playback software module.

In an embodiment of the present invention, an error chiefly generated in the system 10 for monitoring a multi-projection theater may be at least one of network error information of the projection-related apparatus, error information of the projection apparatus 200 and software error information.

The central control server 300 performs a series of error detection processes and classifies detected error information as error code (S317). The central control server 300 may match the classified error code with error code stored in the database and obtain error information and a handling method according to the error from the database. For example, error code corresponding to an error generated in the fan of the projection apparatus 200 may be ERROR001. The central control server 300 may obtain error information (fan driving error) matched with the error code ERROR001 and a corresponding handling method (projection apparatus cold booting or the replacement of the fan) from the database.

The obtained error information and the handling method are immediately transmitted to the administrator terminal 400 (S321). The central control server 300 stores the error information, the handling process, and the log of all of situations generated while content is screened in the multi-projection theater in the database (S318).

For example, if error information is stored in the database, pieces of information, such as "CGV Sangam, 6 theater, 1 round movie playback-impossible, No. 3 projection apparatus error, a fan error, and fan replacement required", may be stored in the database. Furthermore, the information may be stored in the database in a code form of a binary format or in the form of code in which a number and an English alphabet letter are mixed. Accordingly, the central control server 300 can immediately check handling information for an error.

Furthermore, in an embodiment of the present invention, when a playback-impossible determination is made, the central control server 300 may obtain information about the administrator terminal 400 of a person in charge within a multi-projection theater for which the playback-impossible determination was made from the database, and may transmit error information and a handling method to the corresponding administrator terminal 400.

Figure 5:
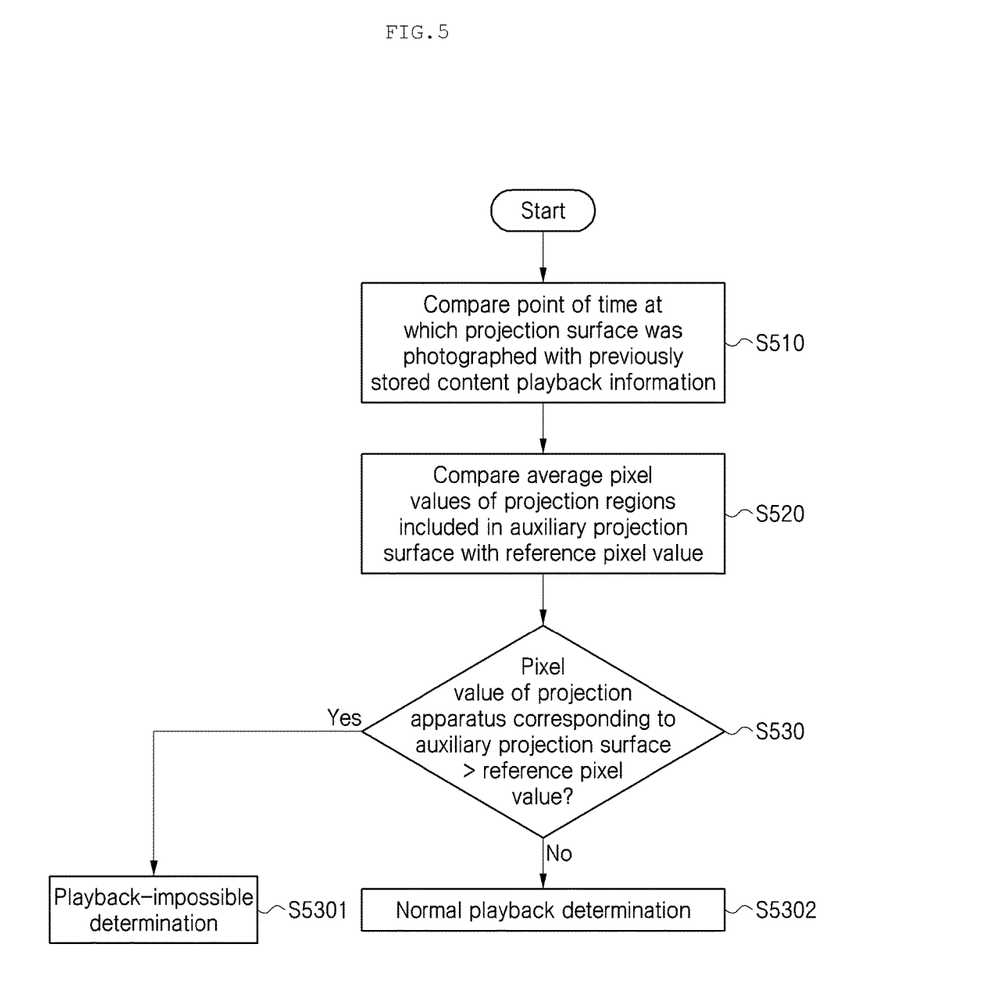
FIG. 5 is a flowchart showing a monitoring method at a point of time at which a plurality of projection surfaces is not used in the method of monitoring a multi-projection theater according to the first embodiment of the present invention.

FIG. 5 is a flowchart showing a monitoring method at a point of time at which a plurality of projection surfaces is not used in the method of monitoring a multi-projection theater according to the first embodiment of the present invention. Referring to FIG. 5, the aforementioned process is a method applied to a multi-projection section in which a plurality of projection surfaces disposed in a theater is all used. The central control server 300 may monitor the auxiliary projection surface 120, 130 not in the case of a multi-projection section.

The central control server 300 receives images of a projection surface from the photographing apparatus at predetermined time intervals and compares a point of time at which the projection surface was photographed in the received image information with previously stored content playback information (S510).

In this case, the previously stored content playback information may be image frame or image file information corresponding to the playback time of content projected by the projection apparatus.

More specifically, content may be continuously projected with 24 frames per second through the projection apparatus 200, and the image is projected at a predetermined time based on the playback information. In this case, the central control server 300 may analyzes the image data received from the photographing apparatus and image information within content to determine whether the content is normally projected.

For example, the time code information may have been included in the metadata of an image file generated for multi-projection screening, or may be information of a file format (e.g., XML or TXT) separately received from the outside along with content.

Accordingly, if, as a result of the comparison, the point of time at which the projection surface was photographed is not identical with a point of time at which content is projected onto the auxiliary projection surface 120, 130, the central control server 300 compares all of the average pixel values of images of one or more projection regions now projected onto the auxiliary projection surface with a reference pixel value (S520).

In some embodiments, the reference pixel value may be the same as a reference pixel value set in the case of a multi-projection section in which content is projected onto the auxiliary projection surfaces 120 and 130.

The central control server 300 compares the pixel value of a content image, projected by the corresponding projection apparatus 200 corresponding to a projection region included in the auxiliary projection surface 120, 130, with the reference pixel value (S530). If, as a result of the comparison, the pixel value of the content image is greater than the reference pixel value, the central control server 300 may make a playback-impossible determination meaning that the corresponding projection apparatus 200 does not normally project the content image onto the auxiliary projection surface 120, 130 (S5301).

In contrast, if the pixel value of the content image projected by the projection apparatus 200 is smaller than the reference pixel value, the central control server 300 may make a normal playback determination meaning that the corresponding projection apparatus 200 normally project the content image onto the auxiliary projection surface 120, 130 (S5302).

If, as a result of the comparison, the point of time at which the projection surface was photographed is not identical with a point of time at which content is projected onto the auxiliary projection surface 120, 130, when a playback-impossible determination is made, the central control server 300 may perform an error check on the central control server 300 itself. A process of transmitting and storing error information and a handling method according to the error check may be performed in the same as that the aforementioned process is performed.

The above process is a method using the photographing apparatus included in the system 10 for monitoring a multi-projection theater. A subsequent method of monitoring a multi-projection theater relates to a method of performing monitoring if the photographing apparatus is not included.

Figure 6:
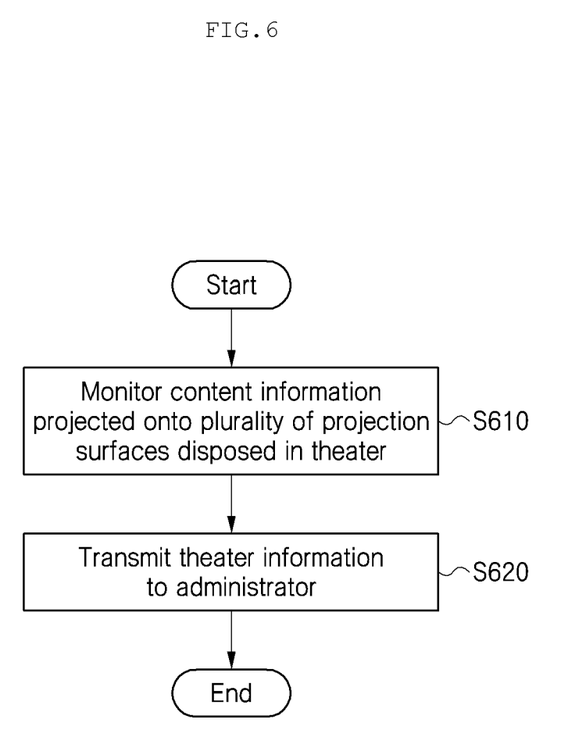
FIG. 6 is a flowchart showing part of the method of monitoring a multi-projection theater according to a second embodiment of the present invention.
Figure 7:
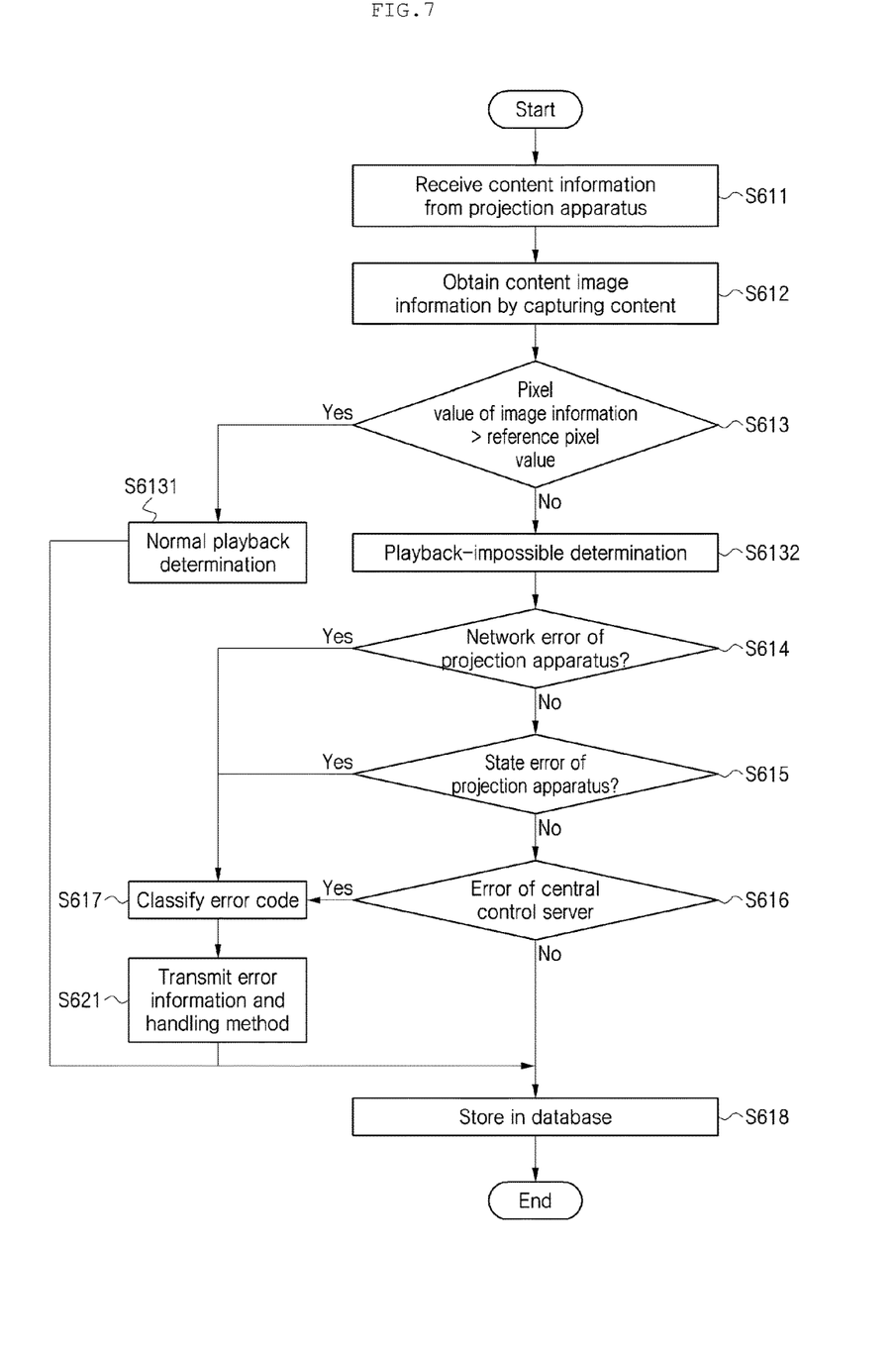
FIG. 7 is a flowchart showing part of the method of monitoring a multi-projection theater according to the second embodiment of the present invention.

FIG. 6 is a flowchart showing part of the method of monitoring a multi-projection theater according to a second embodiment of the present invention. FIG. 7 is a flowchart showing part of the method of monitoring a multi-projection theater according to the second embodiment of the present invention. Referring to FIGS. 6 and 7, the central control server 300 monitors content information projected onto a plurality of projection surfaces disposed in a theater and transmits theater information according to the monitoring to the administrator terminal 400 (S610, S620).

When content screening starts, the central control server 300 receives content information projected onto the plurality of projection surfaces 110~130 in real time from the one or more projection apparatuses 200 disposed in the system 10 for monitoring a multi-projection theater (S611).

In this case, the central control server 300 and the projection apparatus 200 may communicate with each other using a loop through port. Accordingly, the central control server 300 may check the content information projected by the one or more projection apparatuses 200 in real time.

The central control server 300 obtains image information of the content projected by the projection apparatus 200 by capturing the content that is received in real time (S612). In some embodiments, the central control server 300 may obtain the image by capturing the content using a capturing board included in the central control server 300, and may obtain image information of content now being projected by the projection apparatuses 200 included in the multi-projection theater through one time capturing.

The central control server 300 compares all of pixel average values of the obtained image information with a reference pixel value (S613). In this case, the reference pixel value may have the state in which the projection apparatus 200 has not projected any image, that is, the pixel value of one frame if dark image is projected. If an RGB value is defined by 8 bit, this state is (0, 0, 0). This may be set as the reference pixel value.

If, as a result of the comparison, all of the pixel average values of the obtained image information is greater than the reference pixel value, the projection apparatus 200 corresponding to the auxiliary projection surface 120, 130 normally operates, and thus the central control server 300 may make a normal playback determination (S6131).

In contrast, if all of the pixel average values of the obtained image information is not greater than the reference pixel value, the central control server 300 may make a playback-impossible determination meaning that the corresponding projection apparatus 200 does not normally project the content image onto the auxiliary projection surface 120, 130 (S6132). In this case, it may be determined that the corresponding projection apparatus 200 projects only a dark image.

Furthermore, the playback-impossible determination may correspond to a case where a point of time at which the projection apparatus 200 projects the content is faster or slower by a specific time.

After the playback-impossible determination is made, the central control server 300 may perform several processes in order to detect an error within the multi-projection theater. In some embodiments, the central control server 300 may detect an error within the multi-projection theater using a projection apparatus state mode.

The central control server 300 checks the network state of the projection apparatus (S614). To this end, the central control server 300 may transmit a network recognition confirmation message to the projection apparatus 200 and a slave server associated with the projection apparatus 200. If a corresponding acknowledgement (ACK) signal is not received from the projection apparatus 200 and the slave server for a predetermined time after the network recognition confirmation message is transmitted, the central control server 300 may determine a network error of a projection-related apparatus.

More specifically, if the ACK signal is not received from the projection apparatus 200, the central control server 300 may determine a network terminal error of the projection apparatus 200 or a power cable error of the projection apparatus 200.

If ACK signals are received from the projection-related apparatuses, the central control server 300 checks state information of the projection apparatuses 200 corresponding to the projection region (S615). To this end, the central control server 300 may transmit the state check messages of the apparatus included in the projection apparatus 200. For example, the state check messages may include a message indicative of the remaining lifespan of a lamp included in the projection apparatus 200, a message indicating indicative of the operating time of the lamp, and so on. The projection apparatus 200 provides information corresponding to the state check message of the central control server 300. The central control server 300 may check error information based on the information.

The central control server 300 checks an error in the control server itself (S616). This may be a process of checking playback software installed in the central control server 300. The error in the control server itself may include a storage error of the database or an error of a playback software module in the installed playback software or forced termination attributable to a crash between pieces of software in installed in the central control server 300.

In an embodiment of the present invention, an error which may chiefly occur in the system 10 for monitoring a multi-projection theater may be at least one of network error information of a projection-related apparatus, error information of the projection apparatus 200 itself, power cable error information of the projection apparatus 200, content projection time difference information of the projection apparatus 200, and error information of software associated with the projection apparatus 200.

The central control server 300 performs a series of error detection processes and classifies detected error information as error code (S617). The central control server 300 may match the classified error code with error code stored in the database and obtain error information and a handling method according to the error from the database. For example, error code corresponding to an error generated in the fan of the projection apparatus 200 may be ERROR001. The central control server 300 may obtain error information (fan driving error) matched with the error code ERROR001 and a corresponding handling method (projection apparatus cold booting or the replacement of the fan) from the database.

The obtained error information and the handling method are immediately transmitted to the administrator terminal 400. The central control server 300 stores the error information, the handling process, and the log of all of situations generated while the content is screened in the multi-projection theater in the database (S621, S618).

For example, if error information is stored in the database, pieces of information, such as "CGV Sangam, 6 theater, 1 round movie playback-impossible, No. 2 projection apparatus error, a lamp error, and lamp replacement required", may be stored in the database. Furthermore, the information may be stored in the database in a code form of a binary format or in the form of code in which a number and an English alphabet letter are mixed. Accordingly, the central control server 300 can immediately check handling information for an error.

In an embodiment of the present invention, when a playback-impossible determination is made, the central control server 300 may obtain information about the administrator terminal 400 of a person in charge within a multi-projection theater for which the playback-impossible determination was made from the database, and may transmit error information and a handling method to the corresponding administrator terminal 400.

Figure 8:
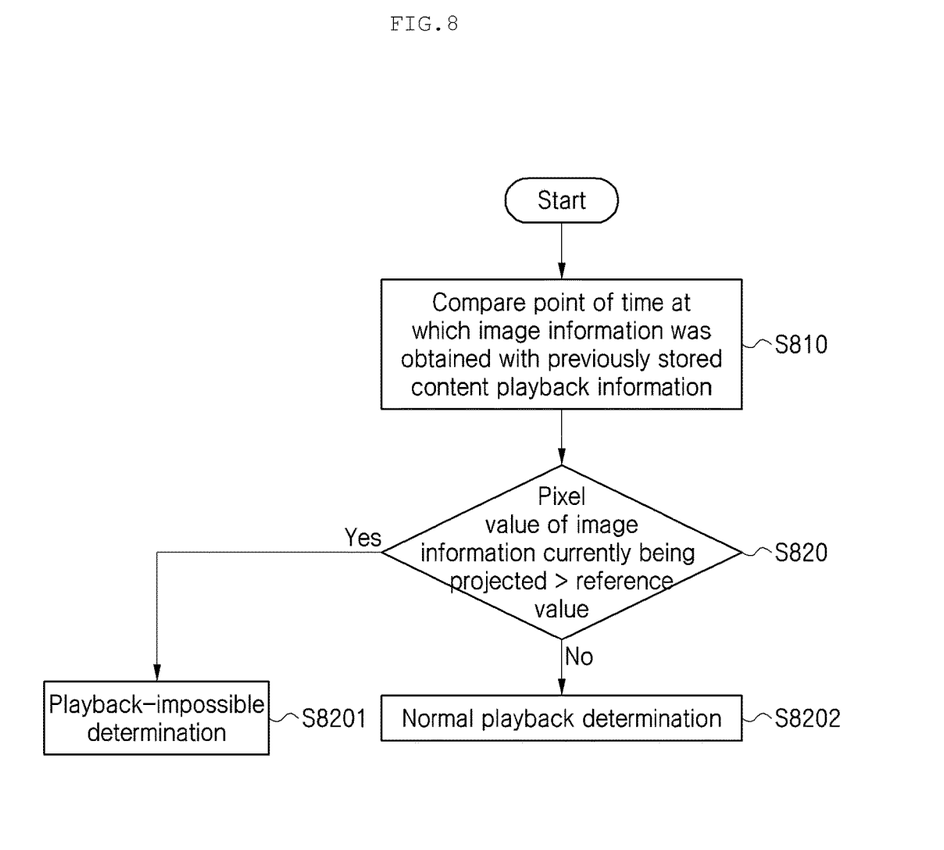
FIG. 8 is a flowchart showing a monitoring method at a point of time at which a plurality of projection surfaces is not used in the method of monitoring a multi-projection theater according to the second embodiment of the present invention.

FIG. 8 is a flowchart showing a monitoring method at a point of time at which a plurality of projection surfaces is not used in the method of monitoring a multi-projection theater according to the second embodiment of the present invention. Referring to FIG. 8, the aforementioned process is a method applied to a multi-projection section in which a plurality of projection surfaces disposed in a theater is all used. The central control server 300 may monitor the projection apparatus 200 corresponding to the auxiliary projection surface 120, 130 not in the case of a multi-projection section.

The central control server 300 obtains image information of content projected by the projection apparatus 200 at predetermined time intervals using a capture-assistant device (e.g., a capturing board), and compares a point of time at which the image information was obtained with previously stored content playback information (S810).

In this case, the previously stored content playback information may be image frame or image file information corresponding to the playback time of content projected by the projection apparatus.

More specifically, content may be continuously projected with 24 frames per second through the projection apparatus 200. Accordingly, each frame may have time code information regarding the time. The central control server 300 may compare a content image received from the photographing apparatus with stored time code.

For example, the time code information may have been included in the metadata of an image file generated for multi-projection screening, or may be information of a file format (e.g., XML or TXT) separately received from the outside along with content.

Accordingly, if, as a result of the comparison, the point of time at which the projection surface was photographed is not identical with a point of time at which content is projected onto the auxiliary projection surface 120, 130, the central control server 300 compares all of the average pixel values of image information that is being projected with the previously stored pixel value (S820).

In some embodiments, the reference pixel value may be the same (0, 0, 0) as a reference pixel value set in the case of a multi-projection section in which content is projected onto the auxiliary projection surfaces 120 and 130.

If, as a result of the comparison, all of the average pixel values of image information is greater than the reference pixel value, the central control server 300 may make a playback-impossible determination meaning that the corresponding projection apparatus 200 does not normally project content on to the auxiliary projection surface 120, 130 (S8201).

In contrast, if, as a result of the comparison, all of the average pixel values of image information is not greater than the reference pixel value, the central control server 300 may make a normal playback determination meaning that the corresponding projection apparatus 200 normally projects content onto the auxiliary projection surface 120, 130 (S8202).

If, as a result of the comparison, the point of time at which the projection surface was photographed is not identical with a point of time at which content is projected onto the auxiliary projection surface 120, 130, when a playback-impossible determination is made, the central control server 300 may perform an error check on the central control server 300 itself. A process of transmitting and storing error information and a handling method according to the error check may be performed in the same as that the aforementioned process is performed.

Furthermore, in an embodiment of the present invention, the central control server 300 measures the pixel value of a projection surface, and also may recognize the plurality of projection surfaces 110~150 while the administrator of the system 10 for monitoring a multi-projection theater plays back content and make a normal or abnormal determination of a corresponding projection apparatus 200.

As described above, while content is played back, the central control server 300 may check whether multi-screening service is provided to the plurality of projection surfaces 110~150 and may notify an administrator who manages the theater monitoring system 10 of the checked information.

Since the central control server 300 provides the handling manual of the projection apparatus 200 according to an error, an administrator who manages a corresponding theater can control the projection apparatus 200 or apparatus within the theater according to the handling manual while content is projected. Accordingly, inconvenience of audiences who watch the content can be solved.

All of the pieces of data or information may be stored in the database of the central control server 300. If an administrator has not solved a corresponding problem while content is played back within a multi-projection theater, information including experts may be provided to the administrator so that an error is solved.

Furthermore, all of the pieces of data or information may be recorded over time. In an embodiment of the present invention, all of the pieces of information may be generated in the form of a single unified rule.

The present invention has been described in detail so far based on the embodiments shown in the accompanying drawings. However, the embodiments are not intended to limit the present invention, but are only illustrative, and they should be considered from a descriptive viewpoint not a limitative viewpoint. The true technical range of protection of the present invention should be determined by the technical spirit of the claims not the aforementioned description.

Although specific terms have been used in the specification, they are merely used to describe the concept of the present invention and are not used to limit the scope of the present invention described in the claims. The steps of the methods of the present invention do not need to be essentially performed in order described in the specification and drawings and may be performed in parallel, optionally or individually. A person having ordinary skill in the art to which the present invention pertains will understand that various modifications and other equivalent embodiments are possible without departing from the intrinsic technical spirit of the present invention written in the claims. Furthermore, it should be understood that the equivalents include equivalents to be developed in the future, that is, all of elements invented to perform the same function regardless of their structures, in addition to the known equivalents.

The invention claimed is:

1. A method of monitoring a multi-projection theater, the method performed by a central control server comprising steps of:
   monitoring a plurality of projection surfaces disposed within a theater; and
   transmitting information of the theater according to the monitoring to an administrator terminal,
   wherein the step of monitoring the plurality of projection surfaces comprises steps of:
      receiving an image information of a projection surface among the plurality of projection surfaces, the projection surface comprising at least one projection region, and the image information being photographed by a photographing apparatus at predetermined time intervals; and
      comparing average pixel values in the at least one projection region within the image information with a reference pixel value of the projection surface, and
   wherein the step of receiving the image information of the projection surface comprises steps of:
      comparing a point of time at which the projection surface is photographed with previously stored content playback information; and
      if the point of time at which the projection surface is photographed is not a point of time at which content is projected onto an auxiliary projection surface of the plurality of projection surfaces, comparing an average pixel value of at least one projection region included in the auxiliary projection surface with the reference pixel value of the projection surface.

2. The method of claim 1, further comprising steps of:
   photographing the projection surface comprising the at least one projection region prior to the step of monitoring the projection surfaces and receiving image information of the projection surface;
   identifying the at least one projection region based on the received image information; and
   setting the reference pixel value of the projection surface based on the received image information.

3. The method of claim 1, further comprising
   a step of detecting an error of a projection-related apparatus within the theater if the average pixel value within the at least one projection region is different from the reference pixel value,
   wherein error information of the theater and a handling method according to the error information are transmitted to the administrator terminal.

4. The method of claim 3, wherein the step of detecting the error comprises steps of:
   checking a network state of the projection-related apparatus;
   checking state information of a projection apparatus corresponding to the at least one projection region; and
   checking an error of a central control server managing content projected by the projection apparatus.

5. The method of claim 3, wherein the error information comprises at least one of network error information of the projection-related apparatus, error information of the projection apparatus itself, and error information of software associated with the projection apparatus.

6. The method of claim 2, wherein the step of identifying the at least one projection region comprises identifying the projection region using at least one of an RGB value of a content image projected onto the projection surface by a projection apparatus corresponding to the at least one projection region, a specific pattern within the image, and a shape of the image.

7. The method of claim 1, further comprising a step of controlling an operation of a projection-related apparatus provided within the theater based on a result of the monitoring.

8. A method of monitoring a multi-projection theater, the method performed by a central control server comprising steps of:
   monitoring information of content projected onto a plurality of projection surfaces disposed within a theater; and
   transmitting information of the theater according to the monitoring to an administrator terminal,
   wherein the step of monitoring the content information comprises steps of:
      receiving an information of the content projected onto the plurality of projection surfaces in real time from one or more projection apparatuses;
      obtaining image information of the content projected by the one or more projection apparatuses by capturing the real-time received content; and
      comparing an average pixel value of the obtained image information with previously stored reference pixel value, and
   wherein the step of obtaining the image information of the content comprises steps of:
      comparing a point of time at which the image information is obtained with previously stored content playback information; and
      if the point of time at which the image information is obtained is not identical with a point of time at which the content is projected onto an auxiliary projection surface of the plurality of projection surfaces, comparing the average pixel value of the image information being projected with the previously stored reference pixel value.

9. The method of claim 8, wherein the reference pixel value is determined based on a gray scale value of the content projected by the one or more projection apparatuses.

10. The method of claim 8, further comprising steps of:
    detecting an error of a projection-related apparatus within the theater if the average pixel value of the obtained image information is different from the previously stored reference pixel value; and
    transmitting error information of the theater and a handling method according to the error information to the administrator terminal.

11. The method of claim 10, wherein the step of detecting the error comprises steps of:
    checking a network state of a projection apparatus;

checking state information of the projection apparatus; and checking an error of a central control server managing content projected by the projection apparatus.

12. The method of claim 10, wherein the error information comprises at least one of network error information of the projection apparatus, error information of the projection apparatus itself, and error information of software associated with the projection apparatus.

13. The method of claim 8, wherein the step of receiving the information of the content in real time comprises communicating with the one or more projection apparatuses using a loop through port.

14. The method of claim 8, further comprising a step of controlling an operation of a projection apparatus corresponding to the plurality of projection surfaces based on a result of the monitoring.

15. A system for monitoring a multi-projection theater, comprising:
- a plurality of projection surfaces disposed within a single theater;
- a projection apparatus configured to project content onto the plurality of projection surfaces;
- a central control server configured to monitor inside of the theater; and
- an administrator terminal configured to receive the monitoring information of the central control server,
- wherein the central control server obtains image information of the content projected by the projection apparatus,
- wherein the central control server compares an average pixel value of the obtained image information with previously stored reference pixel value,
- wherein the central control server transmits error information to the administrator terminal when an image information error of content projected onto the plurality of projection surfaces is generated, and
- wherein
    - the central control server compares a point of time at which the image information is obtained with previously stored content playback information, and
    - if the point of time at which the image information is obtained is not identical with a point of time at which the content is projected onto an auxiliary projection surface of the plurality of projection surfaces, the central control server compares the average pixel value with the previously stored reference pixel value.

16. The system of claim 15, wherein:
one or more projection apparatuses corresponding to the plurality of projection surfaces are provided, and
the system further comprises a photographing apparatus configured to photograph a projection surface comprising a projection region onto which the one or more projection apparatuses project content at predetermined time intervals,
the central control server receives content information projected by the projection apparatus through communication with the one or more projection apparatuses using a loop through method and monitors the received content information.

* * * * *